(12) United States Patent
Schulte

(10) Patent No.: US 10,214,916 B2
(45) Date of Patent: Feb. 26, 2019

(54) COVERING OF RECTANGULAR OR SQUARE PANELS WHICH ARE LAID TO FORM AN ASSEMBLY

(71) Applicant: Guido Schulte, Rüthen-Meiste (DE)

(72) Inventor: Guido Schulte, Rüthen-Meiste (DE)

(73) Assignee: Guido Schulte, Rüthen-Meiste (DE)

( * ) Notice: Subject to any disclaimer, the term of this patent is extended or adjusted under 35 U.S.C. 154(b) by 0 days.

(21) Appl. No.: 15/561,888

(22) PCT Filed: Jan. 13, 2016

(86) PCT No.: PCT/DE2016/100015
§ 371 (c)(1),
(2) Date: Sep. 26, 2017

(87) PCT Pub. No.: WO2016/155696
PCT Pub. Date: Oct. 6, 2016

(65) Prior Publication Data
US 2018/0119429 A1 May 3, 2018

(30) Foreign Application Priority Data
Mar. 27, 2015 (DE) .................... 20 2015 101 572 U

(51) Int. Cl.
*E04F 15/02* (2006.01)
*F16B 5/00* (2006.01)

(52) U.S. Cl.
CPC ..... *E04F 15/02038* (2013.01); *E04F 2201/0146* (2013.01); *E04F 2201/0153* (2013.01);
(Continued)

(58) Field of Classification Search
CPC .......... E04F 15/02038; E04F 2201/042; E04F 2201/0535; E04F 2201/049;
(Continued)

(56) References Cited

U.S. PATENT DOCUMENTS 6,647,690 B1 * 11/2003 Martensson ............ E04F 15/02
52/489.1
8,341,915 B2 * 1/2013 Pervan .............. E04F 15/02038
52/396.04
(Continued)

FOREIGN PATENT DOCUMENTS

DE 602004007469 3/2008
DE 102009041297 3/2011
(Continued)

OTHER PUBLICATIONS

International Search Report issued by the European Patent Office in International Application PCT/DE2016/100015 dated Apr. 15, 2016.
(Continued)

*Primary Examiner* — Joshua K Ihezie
(74) *Attorney, Agent, or Firm* — Henry M. Feiereisen LLC

(57) ABSTRACT

A covering of rectangular or square panels laid to form an assembly is disclosed, wherein the panels are arranged in a chequerboard pattern such that butt joints between the panels cross one another. Each panel has, at its border sides, grooves and tongues for horizontal locking and vertical locking with adjacent panels. The tongues for vertical locking are arranged on two adjacent border sides. The grooves for vertical locking are arranged on the other two adjacent border sides. One of the two tongues is fixed and the other tongue is movable. The panel to be laid first engages below the second panel to be laid subsequently for horizontal locking. For vertical locking, a locking edge is arranged on the first panel and a movable tongue, which can be displaced behind the locking edge, is arranged on the second panel, wherein each of the two tongues fits into each of the grooves for the vertical locking of such a panel.

10 Claims, 9 Drawing Sheets

(52) U.S. Cl.
CPC ... *E04F 2201/023* (2013.01); *E04F 2201/041* (2013.01); *E04F 2201/042* (2013.01); *E04F 2201/043* (2013.01); *E04F 2201/049* (2013.01); *E04F 2201/0535* (2013.01); *E04F 2201/0547* (2013.01); *F16B 5/008* (2013.01)

(58) Field of Classification Search
CPC .......... E04F 2201/043; E04F 2201/023; E04F 2201/0153; E04F 2201/0146; E04F 2201/0547
USPC ........... 52/588.1, 582.1, 586.1, 589.1, 592.1, 52/592.4
See application file for complete search history.

(56) References Cited

U.S. PATENT DOCUMENTS

| | | | |
|---|---|---|---|
| 9,109,366 B2 * | 8/2015 | Schulte | E04F 13/08 |
| 2002/0031646 A1 * | 3/2002 | Chen | B29C 47/0019 |
| | | | 428/167 |
| 2002/0056245 A1 * | 5/2002 | Thiers | B44C 1/24 |
| | | | 52/589.1 |
| 2005/0166514 A1 * | 8/2005 | Pervan | B27F 5/026 |
| | | | 52/578 |
| 2006/0101769 A1 * | 5/2006 | Pervan | E04F 15/02 |
| | | | 52/591.1 |
| 2006/0236642 A1 * | 10/2006 | Pervan | E04F 15/02 |
| | | | 52/578 |
| 2007/0175143 A1 * | 8/2007 | Pervan | B44C 3/12 |
| | | | 52/403.1 |
| 2007/0175148 A1 * | 8/2007 | Bergelin | E04F 15/02 |
| | | | 52/480 |
| 2007/0175156 A1 * | 8/2007 | Pervan | B44C 1/28 |
| | | | 52/582.1 |
| 2007/0184230 A1 | 8/2007 | Verrue et al. | |
| 2007/0193178 A1 * | 8/2007 | Groeke | E04F 15/02 |
| | | | 52/578 |
| 2008/0010937 A1 * | 1/2008 | Pervan | E04F 15/02 |
| | | | 52/588.1 |
| 2008/0110125 A1 * | 5/2008 | Pervan | E04F 15/02 |
| | | | 52/582.2 |
| 2008/0134613 A1 * | 6/2008 | Pervan | E04F 15/02 |
| | | | 52/582.2 |
| 2008/0236088 A1 * | 10/2008 | Hannig | B27M 3/0066 |
| | | | 52/592.1 |
| 2010/0300029 A1 * | 12/2010 | Braun | E04F 15/02 |
| | | | 52/588.1 |
| 2010/0319291 A1 * | 12/2010 | Pervan | E04F 15/02 |
| | | | 52/588.1 |
| 2011/0030303 A1 * | 2/2011 | Pervan | B27F 1/08 |
| | | | 52/582.1 |
| 2011/0225922 A1 * | 9/2011 | Pervan | E04F 13/0894 |
| | | | 52/588.1 |
| 2012/0174521 A1 | 7/2012 | Schulte | |
| 2012/0279161 A1 * | 11/2012 | Hakansson | A47B 47/0075 |
| | | | 52/588.1 |
| 2013/0014463 A1 * | 1/2013 | Pervan | E04F 15/02038 |
| | | | 52/588.1 |
| 2013/0042562 A1 * | 2/2013 | Pervan | E04F 15/02038 |
| | | | 52/582.2 |
| 2013/0047536 A1 * | 2/2013 | Pervan | B26D 1/14 |
| | | | 52/309.1 |
| 2014/0283466 A1 * | 9/2014 | Boo | E04F 15/02038 |
| | | | 52/105 |
| 2014/0290173 A1 * | 10/2014 | Hamberger | E04F 13/0894 |
| | | | 52/582.2 |
| 2015/0000221 A1 * | 1/2015 | Boo | E04C 2/40 |
| | | | 52/588.1 |
| 2015/0300029 A1 * | 10/2015 | Pervan | E04F 15/02038 |
| | | | 52/582.2 |
| 2015/0330088 A1 * | 11/2015 | Derelov | E04F 13/0894 |
| | | | 52/588.1 |
| 2016/0153200 A1 * | 6/2016 | Pervan | E04F 15/102 |
| | | | 52/582.2 |

FOREIGN PATENT DOCUMENTS

| | | |
|---|---|---|
| DE | 102012105793 | 1/2013 |
| EP | 1 650 375 | 4/2006 |
| EP | 2 843 154 | 3/2015 |
| WO | WO 03/016654 | 2/2003 |
| WO | WO 2005/090707 | 9/2005 |
| WO | WO 2011/096879 | 8/2011 |
| WO | WO 2011/127981 | 10/2011 |
| WO | WO 2013/023639 | 2/2013 |

OTHER PUBLICATIONS

U.S. Pat. No. 8,302,367, dated Nov. 6, 2012, Guido Schulte, U.S. Publ. No. 2011-0225921, published date Sep. 22, 2011.
U.S. Pat. No. 8,650,738, dated Feb. 18, 2014, Guido Schulte, U.S. Publ. No. 2011-0094083, published date Apr. 28, 2011.
U.S. Pat. No. 8,407,963, dated Apr. 2, 2013, Guido Schulte, U.S. Publ. No. 2011-0162312, published date Jul. 7, 2011.
U.S. Pat. No. 8,499,520, dated Aug. 6, 2013, U.S. Publ. No. 2011-0162313, published date Jul. 7, 2011.
Guido Schulte et al., U.S. Publ. No. 2012-0124932, published date May 24, 2012.
Guido Schulte, U.S. Publ. No. 2012-0124932, published date May 24, 2012.
U.S. Pat. No. 8,752,352, dated Jun. 17, 2014, Guido Schulte, U.S. Publ. No. 2012-0192521, published date Aug. 2, 2012.
U.S. Pat. No. 8,635,839, dated Jan. 28, 2014, Guido Schulte, U.S. Publ. No. 2012-0174521, published date Jul. 12, 2012.
Guido Schulte, U.S. Publ. No. 2015-0230600, published date Aug. 20, 2015.

* cited by examiner

COVERING OF RECTANGULAR OR SQUARE PANELS WHICH ARE LAID TO FORM AN ASSEMBLY

CROSS-REFERENCE TO RELATED APPLICATIONS

This application is the U.S. National Stage of International Application No. PCT/DE2016/100015, filed Jan. 13, 2016, which designated the United States and has been published as International Publication No. WO 2016/155696 and which claims the priority of German Patent Application, Serial No. 20 2015 101 572.0, filed Mar. 27, 2015, pursuant to 35 U.S.C. 119(a)-(d).

BACKGROUND OF THE INVENTION

The connection relates to rectangular or square panels laid to form an assembly.

Wall, ceiling and floor coverings such as prefabricated parquet flooring, real wood flooring or laminated flooring consist of several, predominantly rectangular, panels. Conventionally the panels have continuous grooves on a longitudinal side and on an end side, and on the respectively opposite longitudinal side or end side continuous tongues, which are form fittingly adapted to the grooves. The panels are installed via the connection between the groove and tongue. Depending on the laying pattern also checkerboard-like laying patterns are possible in which the butt joints between the panels intersect. The term checkerboard-like also means a laying pattern in which essentially rectangular panels are laid in aligned rows and columns so that the butt joints intersect between the panels and not only abut each other in a T-shaped manner.

It is known to arrange mechanical connecting means on the grooves and tongues which latchingly engage with each other in neighboring panels of a floor covering. This is intended to prevent gap formation due to expansion or shrinkage. On the groove or tongue of the panels matching locking elements in the form of depressions, recesses or protrusions are formed in order to hold the joined panels together without glue. Usually the panels are twisted or clicked into each other along their longitudinal sides and are then laterally displaced so that locking rails at the end sides engage with each other. The panels are arranged offset to each other.

Checkerboard-like arranged panels with intersecting butt joints enable different laying patterns. In particular a square panel can be laid rotated by 90° relative to a neighboring panel in order to obtain a more varied laying pattern. In panels for floor coverings usually the groove and tongue are configured different on the longitudinal sides than on the transverse sides so that the panels can only be connected with each other via their longitudinal sides or only via their transverse sides. A rotation by 90° in order to connect a transverse side with a longitudinal side is possible.

SUMMARY OF THE INVENTION

In light of the foregoing the invention is based on the object to provide a covering of panels, wherein the panels have longitudinal and transverse sides and locking mechanisms which make it possible to connect longitudinal sides of a panel with transverse sides of another panel.

This object is solved with a panel with the features of the independent claim.

Advantageous refinements of the invention are set forth in the dependent claims.

The covering according to the invention provides for an assembly of rectangular or square panels, wherein the panels are arranged checkerboard-like. The term checkerboard-like means that the butt joints intersect between the panels. There are always four corners of neighboring panels abutting together. The individual panels are arranged in aligned rows and columns. According to the invention each panel has at its border sides grooves and tongues for horizontal locking and vertical locking with neighboring panels, wherein the tongues for vertical locking are arranged on two neighboring border sides and the grooves for vertical locking are arranged on the two other neighboring border sides. One of the two tongues is fixed. The other tongue is movable. The panel to be laid first is configured so that it engages under the subsequently laid second panel for horizontal locking. For vertical locking a locking edge is arranged on the first panel and the movable tongue on the second panel. The movable tongue is displaceable behind the locking edge. Each of the two tongues fits into each groove for vertical locking of such a panel.

Due to the fact that the two tongues fit into each of the two grooves it is possible to connect the panel with the neighboring panel when rotated by 90°. Therefore different laying patterns are possible with the panel according to the invention. Moreover as a result of a fixed tongue and a movable tongue it is possible to connect the panels with each other in a particularly simple manner.

A preferred manner of laying is the subject matter of claim 2. Herein it is provided that the movable tongues of four panels arranged in a square point in four different directions, wherein the movable tongues of panels that are arranged diagonally opposite each other point in opposite directions. This laying principle can be continued indefinitely so that a repeating pattern is formed. Neighboring panels are hereby always arranged offset to each other by 90°.

The panels can be connected at the border sides at which the tongue is movable by pushing the panels horizontally into each other, by vertical lowering or by pivoting.

The movable tongue is in particular arranged in a holding groove. For connection with a neighboring panel the tongue is displaceable into a release position by elastic deformation during contact with the neighboring panel. When reaching the locking position the elastically deformed tongue moves out of the holding groove again in order to engage behind the locking edge on the other panel for vertical locking. For locking, the movable tongue is therefore moved in two directions. First the tongue has to be urged backwards in order to then assume the locking position again against the spring force which in this case results from the material tension.

The holding groove preferably extends obliquely with respect to the topside of the panel. The tongue always seeks to move out of the holding groove. The orientation of the holding groove additionally supports this movement due to gravity acting on the tongue.

On the panel that engages underneath the neighboring panel with a latching tongue for horizontal locking, a support socket is preferably arranged at a vertical distance to the latching tongue. The support socket serves for orienting the two panels along the height, i.e., for vertical orientation. The support socket or its topside is preferably closer to the topside of the first panel than to the bottom side of the panel. In this way a compressive force exerted by the second panel can be introduced into the first panel close to the topside. The panels remain exactly oriented along the height.

The support socket can also have the function to come into contact with the movable tongue of the neighboring panel during the locking and to elastically deform the tongue during the contact.

In order to prevent the elastic tongue from jamming on the support socket a part of the movable tongue, which protrudes on the longitudinal side out of the holding groove, can have a sliding surface on its bottom side, which is tilted with respect to the installation plane and with respect to the perpendicular to the installation plane. As a result of its tilt the sliding surface causes the tongue to slide off at the support socket when contacting the support socket. This movement is defined by the tilt and the contour of the sliding surface. The sliding surface can be concavely or convexly curved depending on the desired relative movement and desired speed of movement.

The movable tongue is held, preferably captive, in the holding groove. The captive arrangement can be accomplished by form fit, material bonding and/or by force fit. A force fitting connection is a clamping connection in the broadest sense. For this purpose the tongue can have a fixed and a movable part, with the movable part being connected with the fixed part. The movable part, i.e., the locking part can move in and out of the holding groove. The fixed part is clamped in the holding groove. For this purpose protrusions that are oriented in the direction of the groove flanks of the holding groove can be arranged on the tongue. As an alternative or in addition the tongue can be held by material bonding for example by an adhesive, which acts between the tongue and the holding groove. Finally also a form fitting connection is possible. Appropriate protrusions and depressions can be formed on the movable tongue or the holding groove or on regions adjacent the holding groove according to the father-mother principle in order to captively hold the movable tongue in the starting position.

Preferably the movable tongue has at least one holding cam which is arranged outside the holding groove and holds the movable tongue in the locking position and/or in the release position holds the movable tongue by form fit or force fit in the holding groove.

In this case such a holding cam serves two functions: in the starting position the movable tongue is located in the holding groove. In this release position the holding cam is intended to hold the tongue back so that the tongue does not have to be moved back and forth to accomplish the locking. When placing down the second panel the tongue can be easily moved with the holding cam so that the holding cam is moved out of the latching recess in the holding groove provided therefore. Upon further displacement the movable tongue can now be moved from the release position into the locking position. At the same time the holding cam also moves out of the holding groove. The holding cam is now located outside an entry opening of the holding groove so that the movable tongue cannot automatically move back into the holding groove. This is prevented by a positive locking engagement of the holding cam on the entry opening of the holing groove.

In a further embodiment the holding cam is arranged on a leg, which is intended to come into contact with the support socket of the first laid other panel when the second panel to be laid is vertically placed down or pivoted down. This leg is for example formed on a bottom side of the movable tongue. The movable tongue faces toward the bottom side of the panel. Above the leg a cutout is located on the movable tongue. This enables the movement of the leg in vertical direction, i.e., relative to the remaining parts of the movable tongue. Accordingly the holding cam on the leg is oriented downwards and can reach into a latching depression on a bottom side groove flank of the holding groove.

The inventive idea can be used for all floor, wall and ceiling systems, in particular those in which a cover layer is arranged on a carrier, which can in particular be a wood work plate such as for example an MDF, HDF or particle board, such as for example real wood coverings, laminate, carriers with lacquered surfaces as top layer, linoleum, cork on carrier plates etc. The cover layer can in particular be made of a decorative paper with overlay, which defines the visual appearance of the elements. A floor covering can thus for example be a prefabricated parquet floor, a real wood floor or a laminate floor. Also panels made of solid material such as for example wood floor boards, wood elements, cast or injection molded plates made of plastic, in particular PVC made of molded parts or gypsum plates. The tongues can also be used in panels with smaller thickness of 4 mm to 8 mm. The panels can among other things be panels for PVC floors for example carrier plates with topside coverings on PVC basis. Panels can generally be plastic plates or also plates on cement basis, i.e., plates on the basis of mineral materials. The individual panels can be reinforced by fibers.

The covering according to the invention enables in the case of respective locking grooves click connections, which can be produced by pivoting in (fold down) as well as by vertical down placement form above. At the same time it is possible to produce the connection by horizontally pushing the panels into each other in the installation plane or angling within the installation plane. The covering according to the invention can be used for rectangular and square panels with joints that interest. This results a significantly greater freedom of design in this type of the click panels. The panels can be provided in the region of their border sides which a visible rabbet in order to form a clearly visible butt joint. The rabbet can be a step on only one border side or on both border sides. One or both border sides can also be provided with a chamfer. The angle of the chamfer is preferably 30° to 45°.

The tongues can be used for panels with thicknesses from 4 mm to 20 mm.

BRIEF DESCRIPTION OF THE DRAWING

In the following the invention is explained in more detail by way of exemplary embodiments schematically shown in the drawings.

DETAILED DESCRIPTION OF PREFERRED EMBODIMENTS

Figure 1:
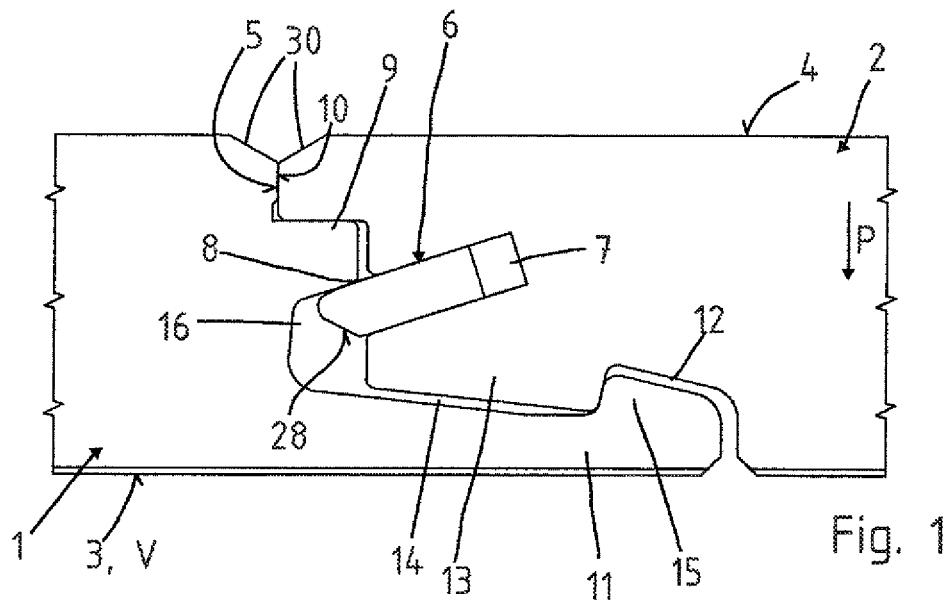
FIG. 1 a vertical section through the border region of two engaged panels of a covering.

FIG. 1 shows a cross section through the connection region of two panels 1, 2. The panels 1, 2 are configured for being joined to form a covering, in particular a floor covering. The panels 1, 2 have a bottom side 3 facing the panel underground and a topside 4, which corresponds to the visible side. The bottom side 3 and the topside 4 extend parallel to an installation plane V. On its side 5 facing the first panel 1 the second panel 2 has a tongue 6 in a holding groove 7. The tongue 6 is provided to engage behind a locking edge 8 on the first panel 1. The locking edge 8 is located below a support rail 9, which is configured as a protrusion on the side 10 of the first panel 1. In this exemplary embodiment the support rail 9 extends on the topside parallel to the installation plane V. On the border side 5 of the second panel 2 a corresponding setback is formed so that the second panel 2 is supported vertically with respect to the installation plane V on the first panel 1 close to its topside 4.

The first panel 1 has a locking rail 11. The locking rail 11 of the first panel 1 protrudes the furthest relative to the side 10 of the first panel 1. The second panel 2 has a downwardly open coupling channel 12 and a downwardly oriented coupling bulge 13 adjoining the coupling channel 12. The second panel 2 is arranged relative to the first panel 1 so that during lowering in the direction of the arrow P the coupling bulge 13 of the second panel 2 engages with an upwardly open coupling channel 14 of the locking rail 11 and the coupling channel 12 of the second panel 2 engages with a coupling bulge 15 of the locking rail 11. This region of the panels 1, 2 serves for horizontal connection of the panels 1, 2.

The down placement in the direction of the arrow P can be accomplished in that the topside 4 of the second panel 2 is displaced parallel to the installation plane V. As an alternative the second panel 2 can be angled relative to the first panel 1 by pivoting about a different border side.

The coupling bulge 15 on the locking rail 11 of the first panel 1 and the downwardly protruding coupling bulge 13 on the second panel 2 each have a slanted topside or bottom side so that also during pushing the panels 1, 2 in direction of the installation plane V, i.e. when horizontally pushed together the coupling bulge 13 of the second panel 2 slides on the coupling bulge 15 of the prior laid panel 1. Hereby the second panel 2 is lifted until the two panels 1, 2 are guided above the highest point of the coupling bulge 15 of the locking rail. Then the second panel 2 automatically slides into the upwardly open coupling channel 14 on the locking rail and assumes the position shown in FIG. 1. The panels 1, 2 can therefore not only be interconnected by vertical down placement or angling but also by pushing the panels horizontally into each other in the direction of the installation plane V. The first panel 1 can also be pushed underneath the second panel 2.

An important component of the connection between the two panels 1, 2 is the tongue 6 and the interaction between the profilings on the region of the border sides 5, 10 of the panels 1, 2. The tongue 6 is made of plastic. It is elastically deformable. It can be displaced into the holding groove 7 and partially out of the holding groove 7 so that the tongue engages behind the locking edge 8. The panel 1, which in the image plane is on the left side, has a locking groove 16 below the locking edge 8. The locking groove 16 with the console 9 located there above and the locking rail 11 located there below is formed in the same manner on the panel 2, which is on the right side in the image plane. In the same manner the border side 5 is formed with the displaceable tongue 6 on the panel 1 which is on the left side in the image plane. In the region of the border sides 5, 10 chamfers 30 are arranged in the transition to the topside 4 of the panels 1, 2. As an alternative a stepping can be formed by a rabbet, which can be arranged on one or both border sides 5, 10. The two panels 1, 2 are configured identical. The panels 1, 2 are square.

Figure 2:
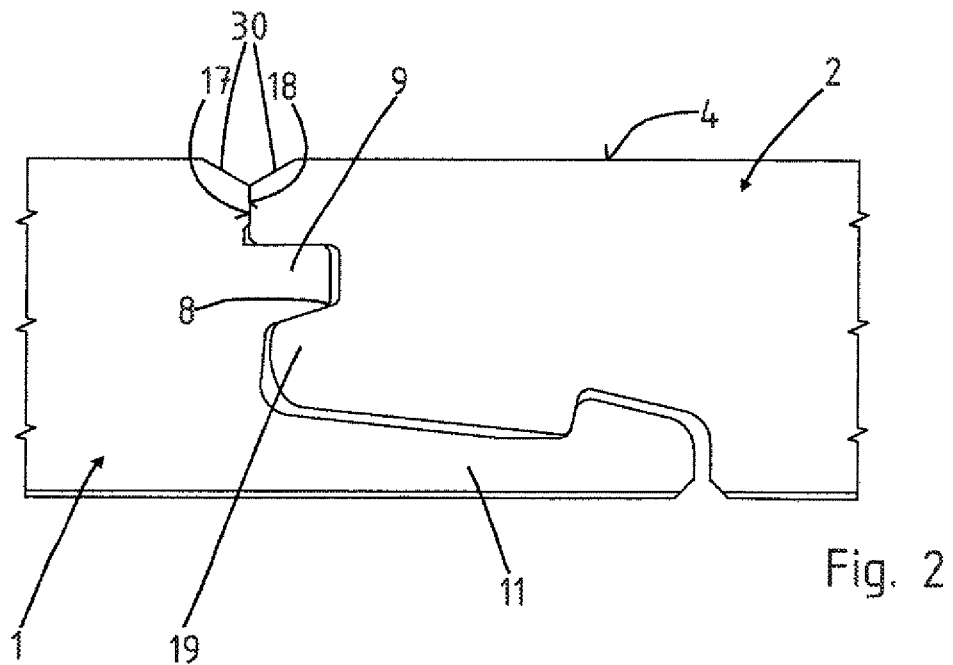
FIG. 2 a vertical section through the border region of two engaged panels at another border side, FIG. 3 an installation arrangement of the panels of FIGS. 1 and 2.

FIG. 2 shows the two other border sides of the panels 1, 2. In this case the panels 1, 2 are interconnected via their border sides 17, 18. The first panel 1 again has a locking rail 11 with the locking groove 16 arranged there above and the following support rail 9. The border side 18 of the first panel is therefore configured like the border side 10. However the second panel 2 in the image plane on the right hand side has no movable tongue at its border side 17 but a fixed tongue 19, which engages behind the locking edge 8 and with this into the locking groove 16. On the border sides 17, 18 again chamfers 30 are formed.

Each panel 1, 2 thus has a border side 5 with a movable tongue 6, a further border side 17 with a fixed border tongue 19 and two further border sides 10, 18 which are configured identically and have a locking groove 16.

Figure 3:
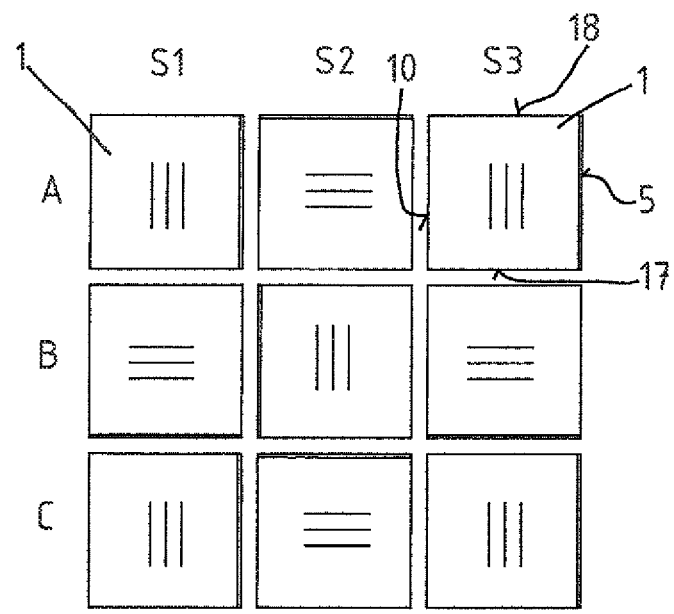
Figure 17:
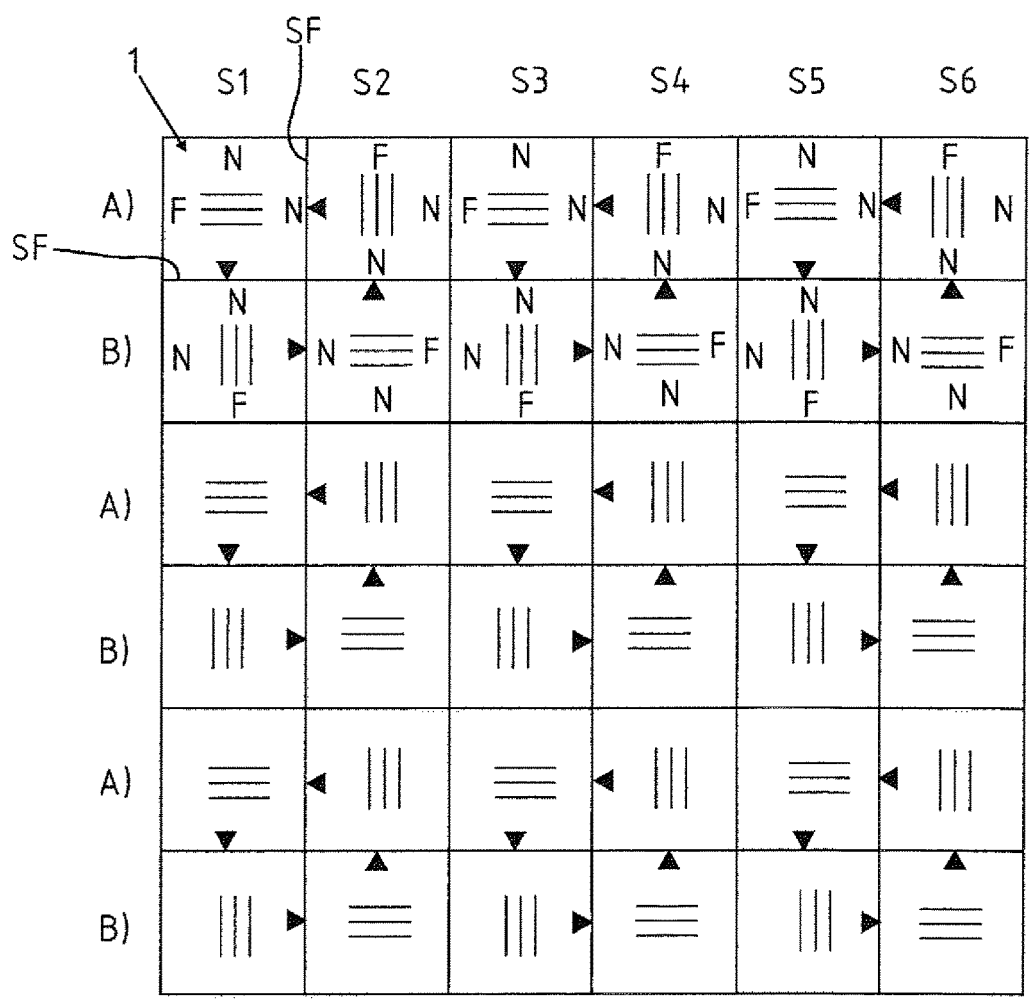
FIG. 17 a further representation of an installation pattern.

The panels 1, 2 configured in this way can be laid in a checkerboard-like assembly, as shown in FIGS. 3 and 17. FIG. 3 shows nine identically configured panels 1, which are arranged checkerboard-like and thus in aligned rows A, B, C and columns S1, S2, S3. All panels 1 are configured identically but are oriented differently. Neighboring panels 1 are respectively arranged offset relative to each other by 90°. The laying pattern is repetitive. Column S1 is identical with column S3. Row A is identical with row C. Correspondingly in the enlarged representation according to FIG. 17 the fourth row is again referred to as A and the fifth row with B.

FIG. 3 shows the border sides 5 with the displaceable tongue 6 as a double line. It can be seen that the border sides 5 with the movable tongue 6 for of neighboring panels 1 always point in different directions. As an alternative it is of course also conceivable that the laying direction of the elastic tongues 6 is always the same. This results a uniform surface structure. Both laying types are possible with the method according to the invention.

FIG. 17 illustrates the position of the individual border sides. The triangular arrow indicates the position of the border sides with the movable tongue 6. F stands for the border side 17 (FIG. 3) with the fixed tongue 19 and the two other border sides 10, 18 indicated with N are the identically configured border sides 10, 18 with the locking grooves 16 (FIGS. 1 and 2). The four panels 1 shown in FIG. 17 on the upper left side in the image plane again show the laying scheme. The panels 1 are arranged aligned in rows A, B and columns S1, S2, S3, S4 S5, S6, The arrows which symbolize the border sides with the movable tongue have different directions. This four-pattern is repeated in the two neighboring columns S3, S4 or the two neighboring rows A, B so that a laying pattern of the assembly of rectangular or square plates results in which the panels 1 are arranged checkerboard-like. As a result of the aligned rows A, B or columns S1, S2, S3, S4 the butt joints SF intersect exactly at the corners of the individual panels 1.

Figure 4:
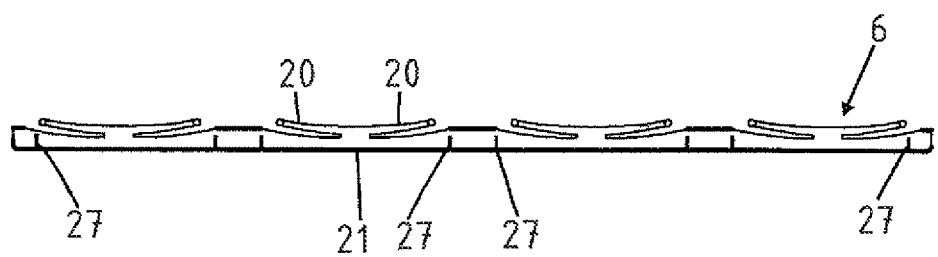
FIG. 4 an embodiment of a displaceable tongue in a top view.

FIG. 4 shows a first embodiment of a tongue 6 in top view. In the following the same reference numerals are used for essentially identical components, in particular tongues. The tongue 6 made of plastic has multiple resilient arms 20, which are located in the installed stated at the groove base of he holding groove 7. At this location the resilient arms 20 are supported. The resilient arms 20 have pair-wise opposite directions. Overall eight resilient arms 20 are provided which in the relaxed position are curved arch like. They are provided to push a locking part 21 of the tongue 6 out of the holding groove 7. The locking part 21 connects the individual pair-wise arranged resilient arms 20 with each other. Respectively between a pair of resilient arms 20 two notches are located whose function becomes apparent in connection with FIG. 5.

Figure 5:
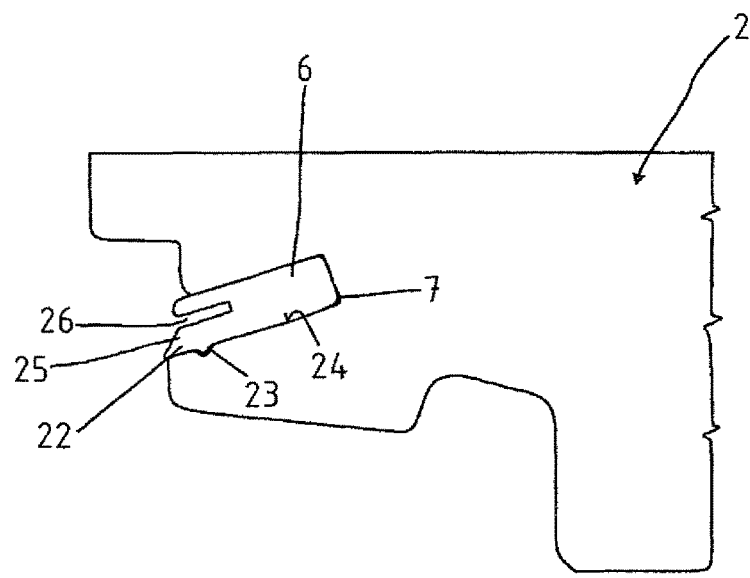
FIG. 5 the tongue of FIG. 4 in an installed state in a panel.

FIG. 5 shows the tongue 6 in the installed state in a panel 2. The tongue 6 is located deep in the holding groove 7. The tongue 6 is in the release position. The tongue 6 is held there by a holding cam 22 provided on the bottom side 7 of the tongue 6. The holding cam 22 engages into a latching depression 23 on a lower groove flank 24 of the holding groove 7. The holding cam 22 is arranged on a leg 25, which is located below a cutout 26. The cutout 26 is so to speak an end-side notch in the tongue 6 so that the leg 25 can freely move upwards. The free movability of the leg 25 is enabled in addition by the fact that perpendicularly to the cutout 26 the notches 27 (FIG. 4) in the tongue 6 are provided. FIG. 4 shows that there are overall three pairs of notches 27. In this region a respective leg 25 is arranged. Additional notches 27 are arranged in the end region of the tongue 6 so that also the end regions off the tongue 6 are provided with a leg 25 as it is shown in the sectional view of FIG. 5.

Figure 6:
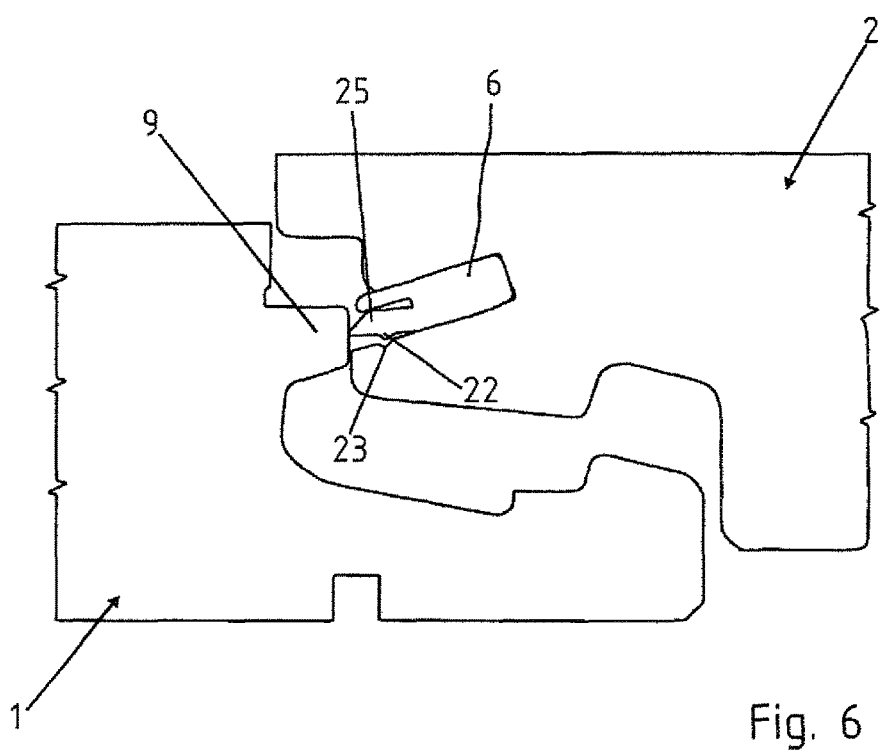
FIG. 6 the panel of FIG. 5 in engagement with the border region of another panel.
Figure 7:
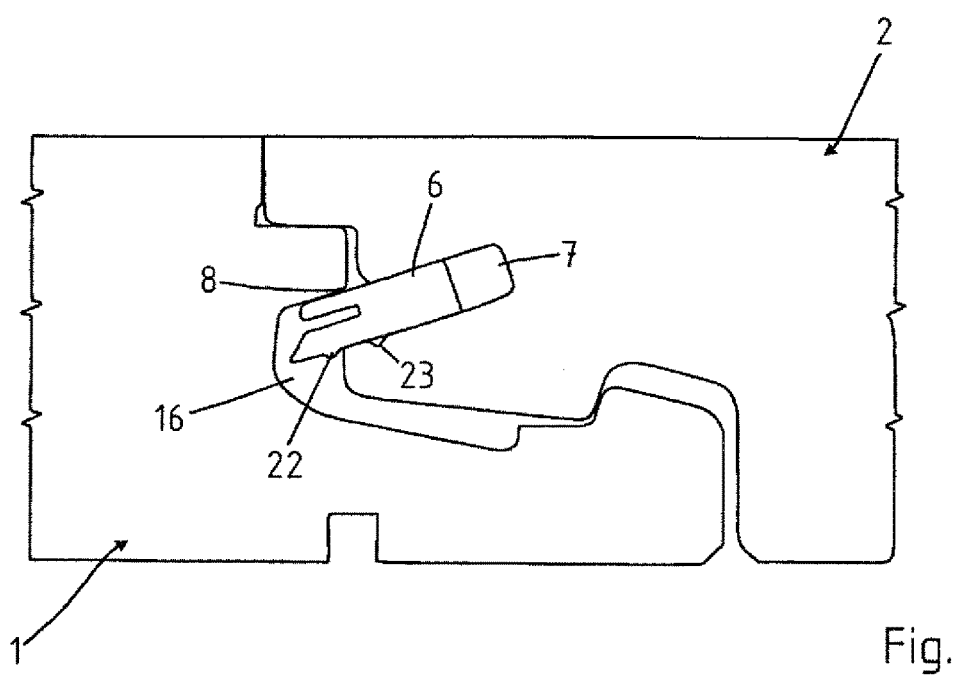
FIG. 7 the panels of FIG. 6 in the locking position.

FIG. 6 shows the functional principle. When placing down the second panel 2 opposite the first panel 1 the leg 25 touches the support socket 9 and is bent so that the holding cam 22 is pushed upwards out of the latching depression 23. Upon further lowering the tongue 6 is pushed away from the groove base of the holding groove 7 via the arms 20 (FIG. 4) so that the tongue 6 engages behind the locking edge 8 and with this the locking groove 16. At the same time the holding cam 22 prevents that the tongue 6 is pushed back into the holding groove 7.

In contrast to the exemplary embodiment of FIG. 1 the tongue 6 in the exemplary embodiment of FIGS. 4 to 7 has no slanted sliding surface 28. The sliding surface 28 (FIG. 1) has an inclination relative to the locking plane V. The sliding surface 28 is provided to push a tongue 6, which also protrudes out of the holding groove 7 in the starting state, back into the holding groove 7 upon an upper-side contact with the support socket 9. When the second panel 2 is completely placed down the tongue 6 snaps behind the locking edge 8. Such a sliding surface 28 is not required in the exemplary embodiment of FIGS. 4 to 7 because the tongue 6 in the starting position does not or only to a minor degree protrude out of the holding groove 7 with the protruding tip of the leg 25. It does not have to be pushed back into the holding groove according to the principle of the slanted plane.

Figure 8:
FIG. 8 a further embodiment of a tongue in a side view.
Figure 9:
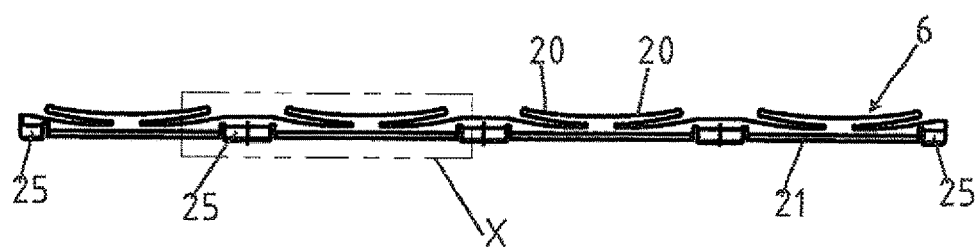
FIG. 9 the tongue of FIG. 8 in a top view.

When placing down of the panel 2 the tongue 6 of FIG. 1 performs a back and forth movement. The tongue 6 of FIGS. 4 to 7 is only moved in one direction, i.e., out of the holding groove 7. FIGS. 8 and 9 show a further design of a tongue 6 in a front view and a top view. The tongue 6 again has arms 20, a locking part 21 and overall five legs 25. Two legs 25 are located respectively in the end region of the tongue 6. Three further legs 25 are located evenly spaced apart between the end side tongues 2. Between respective two tongues 21 an arrangement of two arms 20 is located which again point in opposite directions. The tongue 6, as the other tongues, is a flat component made of plastic.

Figure 10:
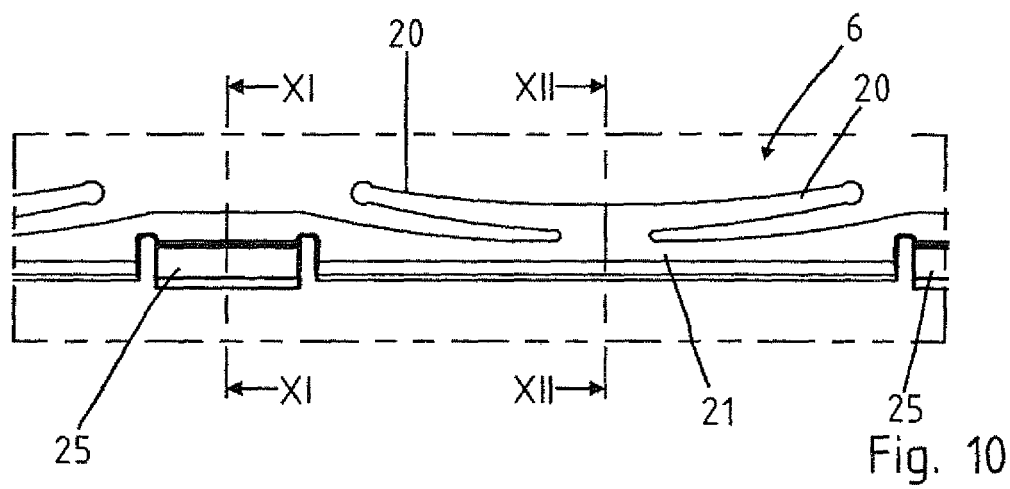
FIG. 10 an enlarged section of FIG. 9.
Figure 11:
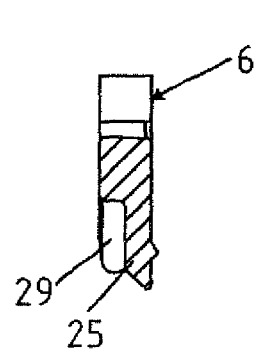
FIG. 11 a section along the line XI-XI in FIG. 10.
Figure 12:
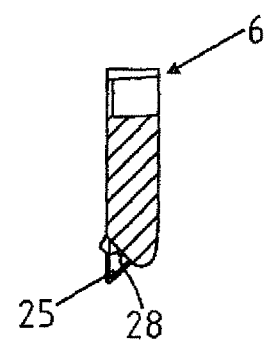
FIG. 12 a section along line XII-XII in FIG. 10.
Figure 13:
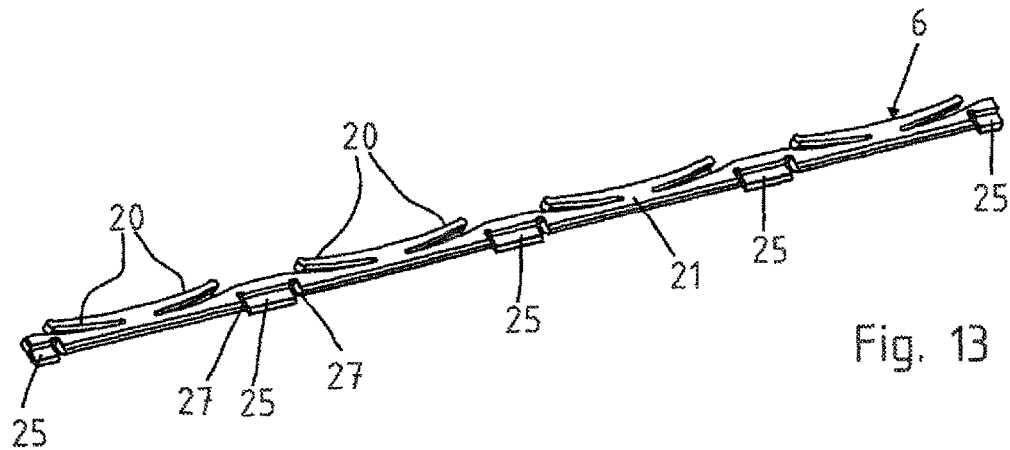
FIG. 13 the tongue of FIGS. 8 and 9 in a perspective view.

FIG. 10 shows in an enlargement of FIG. 9 the position of two sectional planes XI-XI, XII-XII corresponding to FIGS. 11 and 12. As can be seen from FIG. 11 the leg 25 is configured similarly as in the preceding exemplary embodiments. However a free space 29 is located above the leg 25, which distinguishes this embodiment from that of FIGS. 4 to 7. A cutout 26 as shown in FIG. 5 is not present in this case. The sectional view of FIG. 12 in addition shows that in the remaining regions of the tongue 6, i.e., in the regions in which no leg 25 is located, the tongue is provided with a sliding surface 28 as in the exemplary embodiment of FIG. 1. This exemplary embodiment therefore combines features of the first exemplary embodiment and the second exemplary embodiment. FIG. 13 shows this embodiment of a tongue 6 in a perspective view. It can be seen that on their topside facing the viewer a recess 29 is provided adjacent the legs 25. The legs are delimited by notches 27.

Figure 14:
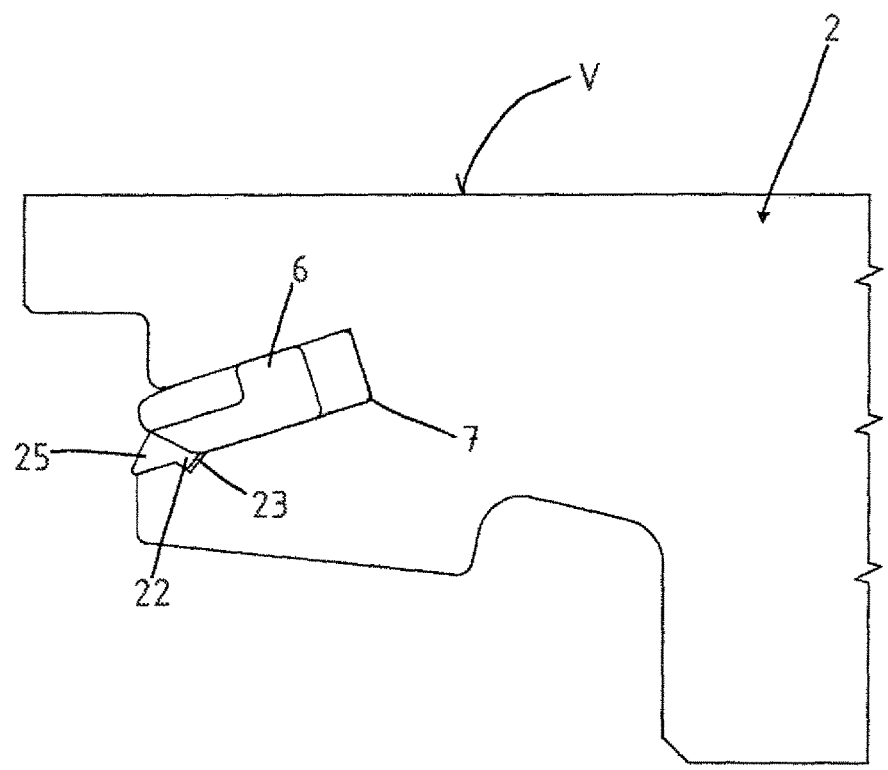
FIG. 14 the tongue of FIG. 13 in the installed state in the release position.
Figure 15:
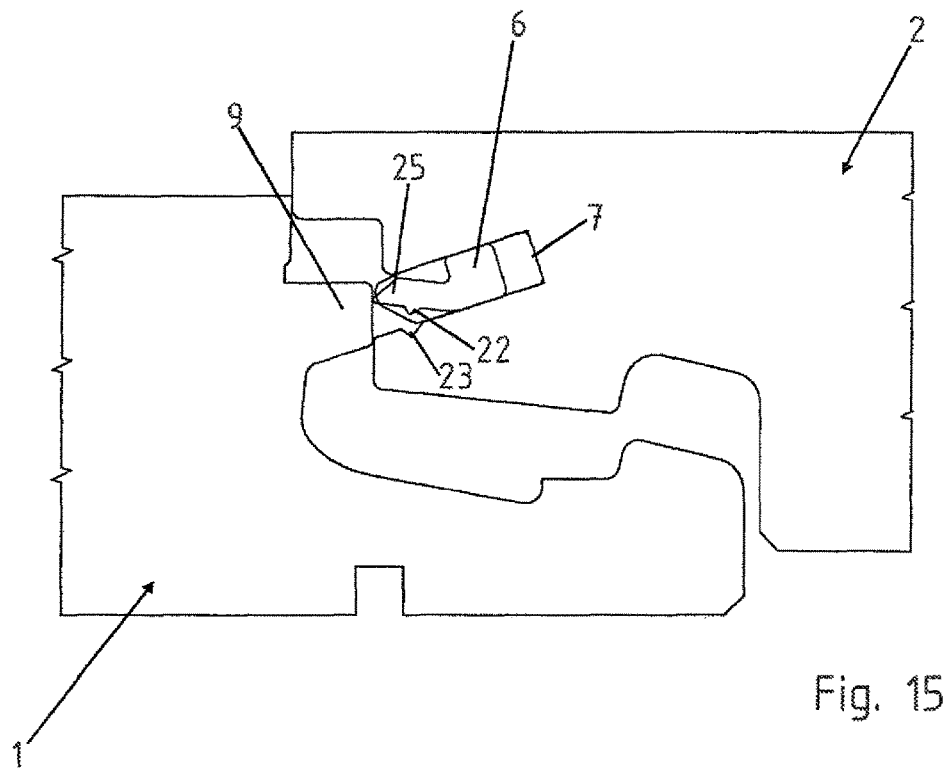
FIG. 15 the tongue of FIG. 13 during the locking process with a neighboring panel.
Figure 16:
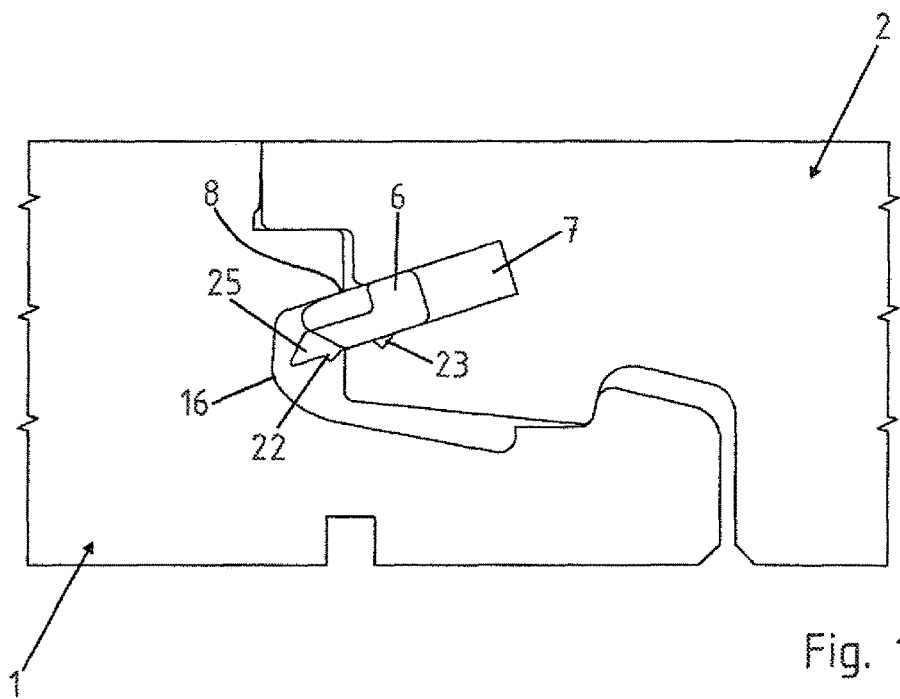
FIG. 16 the panels of FIG. 15 in the locked state.

FIGS. 14 to 16 show the tongue 6 in the installed state. The tongue 6 is in the release position within the slanted holding groove 7. In all exemplary embodiments the holding groove 7 extends slanted from bottom to top. This means that the entry opening of the holding groove 7 is positioned lower than the inside or the lowest point of the holding groove 7. The groove flanks of the holding groove 7 extend parallel and tilted relative to the installation plane V.

FIG. 15 shows how the panel 2 on the right hand side in the image plane engages with the already laid panel 1. The leg 25 is pushed upwards as a result of the contact with the support socket 9 so that the holding cam 22 is lifted out of the latching depression 23. Finally the tongue 6 is displaced out of the holding groove 7 in the direction toward the locking groove 16 as a result of the spring force of the not further shown arms so that the tongue engages behind the locking edge 8 of the first panel 1. The holding cam 22 prevents the tongue 6 from sliding back in the holding groove 7. The tongue is held in the open position by the spring force of the arms.

The invention claimed is:

1. A covering, comprising:
    rectangular or square panels laid in an assembly and arranged in a checkerboard pattern so that butt joints between the panels intersect,
    each panel having a movable tongue provided on a first one of four border sides of the panel, a fixed tongue on a second one of the four border sides adjoining the first border side and a respective groove on each of the remaining two of the four border sides, any of said movable tongue and fixed tongue fitting into any of the respective groove for vertical locking of respective neighboring ones of the panels,
    wherein for horizontal locking of the neighboring panels a first laid one of the neighboring panels engages under a subsequently laid one of the neighboring panels,
    wherein for the vertical locking of the neighboring panels the movable tongue of the subsequently laid panel is displaceable behind a locking edge provided on the first laid panel,
    wherein a holding groove extends slanted relative to a topside of the panel so that during connection of the neighboring panels the movable tongue is displaceable obliquely downwards; and wherein the movable tongue has at least one holding cam which is arranged outside the holding groove when the movable tongue engages behind the locking edge, said holding cam holding the movable tongue in the locking position or holding the movable tongue in the holding groove in the non-locking position by form fit or by force fit.

2. The covering of claim 1, wherein the movable tongues of four respective panels of the covering respectively point in four different directions, and wherein the movable tongues of diagonally opposing ones of the four respective panels point in opposite directions.

3. The covering of claim 1, wherein the neighboring panels are connectable through engagement of the first border side of the subsequently laid panel with one of the remaining border sides of the first laid panel, by horizontally pushing the neighboring panels into each other, by vertical down placement of the subsequently laid panel or by pivoting of the subsequently laid panel.

4. The covering of claim 1, wherein the movable tongue is arranged in the holding groove and for connection of the subsequently laid panel with the first laid panel the movable tongue is displaceable by elastic deformation through contact with the first laid panel so as to assume a release position, said release position enabling the movable tongue to move out of the holding groove from a non-locking position into a locking position in which the movable tongue engages behind the locking edge on the first laid panel for vertical locking.

5. The covering of claim 1, wherein the first laid panel has a latching tongue and engages under the subsequently laid panel with the latching tongue, and wherein a support socket is arranged on the first laid panel at a vertical distance to the latching tongue.

6. The covering of claim 5, wherein the movable tongue is elastically deformable by the support socket of the first laid panel during a vertical downward placement of the subsequently laid panel.

7. The covering of claim 5, wherein the movable tongue has the at least one holding cam and a leg which comes into contact with the support socket during vertical placement or pivoting of the subsequently laid panel, said at least one holding cam being provided on the leg of the movable tongue.

8. The covering of claim 1, wherein the movable tongue has a locking part, which protrudes on a longitudinal side out of the holding groove, said locking part having a bottom side provided with a sliding surface which is slanted relative to an installation plane of the covering.

9. The covering of claim 1, wherein the movable tongue is captively held in the holding groove by at least one of form fit, material bonding and force fit.

10. The covering of claim 1, wherein a border-side butt joint between the neighboring panels has a chamfer or a rabbet provided in a transition to a topside of the neighboring panels.

* * * * *